US006970899B2

(12) United States Patent
Elbe et al.

(10) Patent No.: US 6,970,899 B2
(45) Date of Patent: Nov. 29, 2005

(54) CALCULATING UNIT AND METHOD FOR SUBTRACTING

(75) Inventors: Astrid Elbe, Munich (DE); Norbert Janssen, Munich (DE); Holger Sedlak, Sauerlach (DE); Jean-Pierre Seifert, Munich (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/957,536

(22) Filed: Oct. 1, 2004

(65) Prior Publication Data

US 2005/0097156 A1 May 5, 2005

Related U.S. Application Data

(63) Continuation of application No. PCT/EP03/03401, filed on Apr. 1, 2003.

(30) Foreign Application Priority Data

Apr. 10, 2002 (DE) ................................ 102 15 784

(51) Int. Cl.⁷ .............................................. G06F 7/50
(52) U.S. Cl. .................................... 708/706; 708/712
(58) Field of Search ................................ 708/706, 712

(56) References Cited

U.S. PATENT DOCUMENTS

| | | | |
|---|---|---|---|
| 3,987,291 A | | 10/1976 | Gooding et al. |
| 4,623,981 A | | 11/1986 | Wolrich et al. |
| 4,764,887 A | * | 8/1988 | Lai et al. ..................... 708/711 |
| 4,817,031 A | | 3/1989 | Tokumaru |
| 4,905,180 A | * | 2/1990 | Kumar ........................ 708/712 |
| 4,942,549 A | * | 7/1990 | Jutand et al. ............... 708/706 |
| 5,337,269 A | * | 8/1994 | McMahan et al. .......... 708/711 |
| 6,199,091 B1 | * | 3/2001 | Kobayashi et al. ......... 708/706 |
| 6,735,612 B1 | * | 5/2004 | Kobayashi et al. ......... 708/706 |
| 6,742,014 B2 | * | 5/2004 | Bradley ...................... 708/712 |
| 2002/0091744 A1 | * | 7/2002 | Kantabutra et al. ......... 708/712 |

FOREIGN PATENT DOCUMENTS

| | | |
|---|---|---|
| DE | 35 40 800 A1 | 8/1987 |
| DE | 36 31 992 A1 | 11/1987 |
| GB | 2 215 496 A | 9/1989 |

* cited by examiner

*Primary Examiner*—Tan V. Mai
(74) *Attorney, Agent, or Firm*—Darby & Darby (57) ABSTRACT

Calculating unit having adder blocks, each having single adders, a carry input, a carry output, and a carry pass output, wherein a signal at the carry pass output is indicative of a carry passing through the adder block. Depending on the carry pass output signal, a clock generator for feeding the adder blocks with operands to be processed is decelerated. A determining unit determines in which of the adder blocks a least significant bit of an operand to be subtracted is disposed. A deactivating unit deactivates a carry pass output of adder block(s) provided for lower order digits with respect to the adder block in which the least significant bit is disposed, and a feeding unit feeds a carry into the carry input of this adder block in which the least significant bit is disposed.

8 Claims, 3 Drawing Sheets

CALCULATING UNIT AND METHOD FOR SUBTRACTING

CROSS-REFERENCE TO RELATED APPLICATION

This application is a continuation of copending International Application No. PCT/EP03/03401, filed Apr. 1, 2003, and which is incorporated herein by reference in its entirety.

BACKGROUND OF THE INVENTION

1. Field of the Invention

The present invention refers to long-number calculating units and particularly to long-number calculating units with limited carry path.

2. Description of the Related Art

DE 3631992 C2 discloses a cryptography processor for efficient execution of the public key method of Rivest, Shamir and Adleman, which is also known as RSA method. The modular exponentiation needed in this method is calculated by using a multiplication look-ahead method and a reduction look-ahead method. Therefore, a three operand adder is used. The disclosed three operand adder has a length of 660 bits. An elementary cell consists of several cryptoregisters, a shifter, a half adder, a full adder and a carry-look-ahead element. Four such elementary cells form a four-cell block, wherein a carry-look-ahead element is associated to the four-cell block. Five such four-cell blocks form a 20-cell block. The encryption unit consists overall of 33 such 20-cell blocks and a control unit, which comprises a clock generator for clocking the elementary cells. The carry-look-ahead elements of the four-cell blocks are connected together in order to realize whether a carry propagates over a bigger distance, namely 20 bits. When a propagate signal of the 20-bit block is active, this means that the carry of the considered 20-bit blocks depends on a carry at the output of the previous block. However, when the propagate signal of a 20-bit block is not active, this means that a possibly present carry at the output of this block, i.e. at the most significant bit of this block has been generated within this block, but is not influenced by the previous block.

Thus, it is possible to make the clock of the calculating unit, i.e. the rate with which the new input operands are fed in, faster than the worst case, where the carry path extends from the least significant bit of the whole calculating unit to the most significant bit of the whole calculating unit. If a propagate signal is activated for a 20-bit block, the clock of the whole calculating unit is decelerated such that the worst case is considered, i.e. the calculating unit is stopped until a carry from the least significant bit of the whole calculating unit has propagated to the most significant bit of the whole calculating unit.

The cycle time, i.e. the time after which the next input operands are fed into the calculating unit, is thus set such that it is just sufficient to process the carry of directly adjacent blocks. This has the advantage that independent of the number of digits or elementary cells of the calculating unit only the time of a block carry has to be considered. If, however, a determination is made that the carry of the current block is not only affected by the previous block but also by the block preceding the previous block, the cycle time is made so slow that there is enough time for a complete carry path.

The described concept is advantageous in that no longer the length of the calculating unit determines the velocity, but the velocity corresponds to the length of a block, i.e. to the length of the carry path to be expected—but also to the number of blocks.

The described method is disadvantageous in that, when it is determined that a carry propagates over a longer distance than one block, i.e. when a so-called panic signal is generated, the calculating unit is stopped as a whole, in order to consider the worst case. If, therefore, the length of a block is chosen short, which is as such desirable, since the clock period can be increased (the cycle time can be decelerated), no significant velocity gain will occur, since panic signals occur more often, so that the calculating unit as a whole is slowed down by the constant panic case.

If, however, the length of a block is chosen relatively long to decrease the number of panic cases and almost eliminate it, respectively, the cycle time has to be increased as well, since it has to be so big that maximally the case is considered where a carry is generated in the second least significant bit of the previous block, passes through the previous block and further passes through the current block.

Thus, a short block length leads to a higher clock rate, but, however, leads all in all to a reduced performance of the calculating unit due to the heavily increasing number of panic cases. A long cycle time, i.e. a low clock rate, leads, however, to a decreasing number of panic cases, is, however, not desirable in that only a limited number of addition processes can be performed rate in a certain time due to the low clock.

For the context of the probability for a panic event the following equation, which summarizes the previous statements applies:

$$P = 1 - (1 - 2^{-BL})^{(NBL-2)}.$$

In the above equation, P is the probability for the occurrence of a panic event, BL is the block length and NBL is the number of blocks.

A disadvantage of the described calculating unit with limited carry path is the fact that a subtraction cannot be performed easily. The subtraction $$c = a - b$$

is typically not calculated directly, but by inverting the parameter b and then summing the inverted parameter b to a:

$$c = a + (-b).$$

The negation of the parameter b is typically achieved by inverting the operand b in its form stored in the register, and by adding a one:

$$c = a + (\bar{b} + 1)$$

When the LSB of the operand b, which has been inverted, typically falls on the least significant bit of the least significant adder block, the inversion of the operand b causes no problem. If, however, a calculating unit is used, whose length in bits is greater than the number of bits of the operand to be subtracted, the case can and will be occur that the LSB of the two operands to be processed does no longer coincide with the least significant bit of the least significant adder block, but falls on a higher order bit of the least significant adder block or even into a higher order block. The bits below the current least significant bit are set to 0.

When now the register where the operand b is stored, is inverted, the actually insignificant bits below the least significant bit (LSB) of the operand b are set to one. If no counter measures are taken, this leads to the fact that a panic signal is triggered, since all propagate values of the adder blocks below the blocks where the least significant bit is, are equal to 1. A subtraction would therefore automatically lead to a "total stop" of the calculating unit.

To prevent this case, a complete turnoff of the adder blocks below the blocks where the least significant bit of the second operand b is, is effected in the known cryptography processor, which is, for example, available under the name "Advanced Crypto Engine" (ACE) at Infineon Technologies AG, Sankt-Martin-Str. 53, 81669 Munich, Germany. This is performed via a specific command, which is called "Adjust CU" in the ACE.

A disadvantage of this solution is that it is only possible within a calculation, i.e. a complete multiplication with fixed least significant bit. This implies directly that the calculating unit for look-ahead algorithms needs an overflow buffer for shifting the operands.

A disadvantage of a calculating unit with overflow buffer is that there might be an unused area, which can be used for shifting and as underflow buffer, respectively.

SUMMARY OF THE INVENTION

It is an object of the present invention to provide a better concept for implementing a subtraction.

In accordance with a first aspect, the present invention provides a calculating unit having a plurality of adder blocks, wherein each adder block has a plurality of single adders, a carry input, a carry output and a carry pass output, wherein a total number of single adders of the plurality of adder blocks is greater than a number of digits of an operand to be subtracted, wherein a signal at the carry pass output of an adder block is indicative of a carry passing through the adder block; a clock generator for feeding the adder blocks with operands to be processed according to a clock; a controller for controlling the clock generator such that the clock with which the operands to be processed are fed in, is decelerated, when the signal at the carry pass output is active; a unit for determining in which adder block of the adder blocks a least significant bit of the operand to be subtracted is disposed; a unit for deactivating the carry pass output of one or several adder blocks, which are provided for lower order digits with regard to the adder block, in which the least significant bit of the operand to be subtracted is; and a unit for feeding in a carry into the carry input of the adder blocks, in which the least significant bit of the operand to be subtracted is.

In accordance with a second aspect, the present invention provides a method for subtracting a second operand from a first operand with a calculating unit with a plurality of adder blocks, wherein each adder block has a plurality of single adders, a carry input, a carry output and a carry pass output, wherein a total number of single adders of the plurality of adder blocks is greater than the number of digits of an operand to be subtracted, wherein a signal at the carry pass output of an adder block is indicative of a carry passing through the adder block, having the steps of controlling a clock, by which operands to be processed are fed in, so that the clock is decelerated when a signal is active at a carry pass output; determining, in which adder block a least significant bit of the operand to be subtracted is disposed; deactivating the carry pass output of one or several adder blocks, which are provided for lower order digits with regard to the adder block, in which the least significant bit of the operand to be subtracted is; and feeding in a carry into the carry input of the adder block, in which the least significant bit of the operand to be subtracted is.

The present invention is based on the knowledge that the realization of an underflow buffer helps to simplify a calculating unit, which is based on look-ahead algorithms.

In order to avoid a total stop of the calculating unit due to a panic signal, which is caused when the LSB of the operand to be subtracted is not in the least significant adder block, according to the invention, the panic signal of the block or the blocks, respectively, below the blocks where the least significant bit is, is deactivated. Thus, the adder blocks are not turned off totally, but merely the panic signal generated by the adder blocks after an inversion of the register where the operand to be subtracted stands, are deactivated, so that no panic can be signaled to the clock generator by the adder blocks below the blocks where the LSB is.

The addition of a "1" caused by the subtraction is inventively caused by the fact that a 1 is fed as an input carry into the block where the least significant bit is. Independent of the fact in which elementary cell of the block the least significant bit of the operand to be subtracted actually is, the addition with 1 is performed correctly, since all bits below the least significant bit in the adder block are set to "1" due to the inversion and the fed in carry will ripple automatically to its correct position.

It is further preferred to also deactivate the panic signal of the block where the least significant bit is, since this is the lowest "active" adder block whose carry path can in no case be longer than the whole block length.

Above that, it is preferred to feed in a "1" as input carry in every adder block to set the result register of the respective adder blocks to 0 in order to put the adder blocks below the least significant bit in their initial state, i.e. that the bits below the least significant bit are set to 0. Finally, in order to avoid that this measure has again an effect on the block with the least significant bit, the carry input of the block where the least significant bit is, is separated from the carry output of the next lower significant adder block.

In principle, it would be enough to feed in a "1" into the carry input of the least significant adder block, to bring all digits in the result register of the calculating unit below the LSB to "0". However, this measure is achieved quicker when a carry input signal is fed separately into each adder block below the blocks where the LSB of the operand is. In this case, the carry outputs of all blocks below the adder blocks with the least significant bit are to be blocked, i.e. to be prevented from a propagation into the next higher adder block.

It is an advantage of the present invention that now by adaptive treatment of the adder blocks below the least significant bits from cycle to cycle of the calculating unit, the full width of the calculating unit can be utilized. This makes it possible to now work with variable underflow buffer, which makes different look-ahead algorithms easier and faster to implement. Particularly, the double look-ahead algorithm both for the multiplication and for the modular reduction of the ZDN method, which is described in the mentioned German Patent, can now take place more efficient and faster.

BRIEF DESCRIPTION OF THE DRAWINGS

Preferred embodiments of the present invention will be explained below in more detail with reference to the accompanying drawings.

DESCRIPTION OF THE PREFERRED EMBODIMENTS

Before reference will be made to the inventive treatment of the adder blocks below the blocks where the least significant bit of the operand is, with regard to FIGS. 2 and 3a to 3e, first, a calculating unit is described with regard to FIG. 1, wherein the inventive measures can be used advantageously. Although a calculating unit with panic hierarchy is described in FIG. 1, the present invention can also be used in a calculating unit with a simple panic control, to enable such a calculating unit to use the total width of the calculating unit in every cycle.

Figure 1:
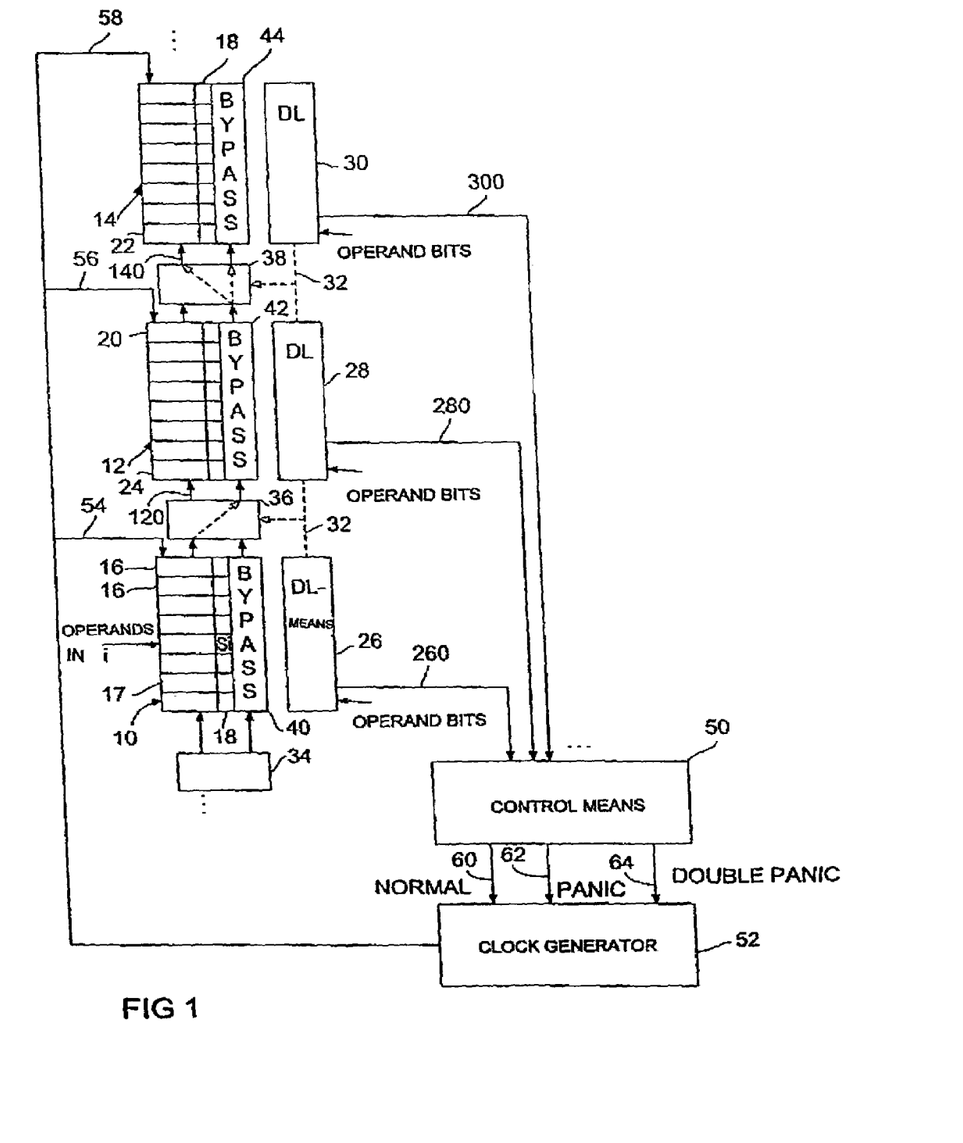
FIG. 1 shows a calculating unit wherein the present invention can be used.

FIG. 1 shows an inventive calculating unit with a first adder block 10, a second adder block 12 and a third adder block 14. The three adder blocks 10, 12, 14 are typically adder blocks of a calculating unit with a significantly higher number of adder blocks, such as 64 for a calculating unit with a total length of 1024 bits, wherein one block comprises 16 elementary cells, or 128 for a calculating unit with 2048 bits, when one adder block has a length of 16 bit. Such calculating unit lengths are necessary in order to be able to carry out the RSA method with respective key lengths of 1024 or 2048 bits. In the elliptic curve cryptography, a respective security can be obtained with significantly lower key lengths, such as 160 bit, wherein here 10 adder blocks with 16 bit each are sufficient.

Each adder block 10, 12, 14 consists of a number of elementary cells 16, which are typically made up identically. Each elementary cell, as it is also the case in the prior art, comprise registers for storing 2, 3 or more operands, a shifter and an adder, and comprises typically also an output register for storing a sum bit of the operation $S_i$, as is shown in FIG. 1 at 18. The adder within an elementary cell can be an one-bit full adder, as needed, i.e. an adder which receives two bits as well as a carry of a low order elementary cell as input quantities, and which outputs a sum bit $S_i$ as well as a carry for the higher order adjacent elementary cell as output quantities. Alternatively, the adder within an elementary cell can also be a combination of a half adder and a full adder, to carry out a three operand operation for summing three different operands. All used adders within an elementary cell have the propriety that they provide a carry bit to the next higher elementary cell, that they provide a sum bit $S_i$, and that they receive a carry of a next lower elementary cell.

As it is shown in FIG. 1, the adder blocks 10, 12, 14 are interconnected such that always the most significant elementary cell, such as the elementary cell 20 of the second adder block 12 is connected to the least significant elementary cell 22 of the third adder block 14. Correspondingly, the least significant elementary cell 24 is connected to the most significant elementary cell 16 of the first adder block 10.

Each adder block further comprises carry pass means 26, 28 and 30, respectively, which receives the operand bits of the one-bit full adder within an elementary cell as input signal, and which supplies a panic signal 260, 280, 300 on the output side.

As will be explained below, each pass means further provides a control signal 32 to cause a respective carry control means 34, 36, 38 to put a carry on a carry bypass 40, 42 or 44 and not to take a carry from a next lower block from the most significant elementary cell of this block, respec-
tively, but from the carry bypass of this block when a carry has been put on the carry bypass.

Further, the inventive calculating unit comprises control means 50 as well as a clock generator 52, which controls the clock and the clock period, respectively, by which new input operands are fed into the elementary cells of the adder blocks, via clock control lines 54, 56, 58.

Figure 2:
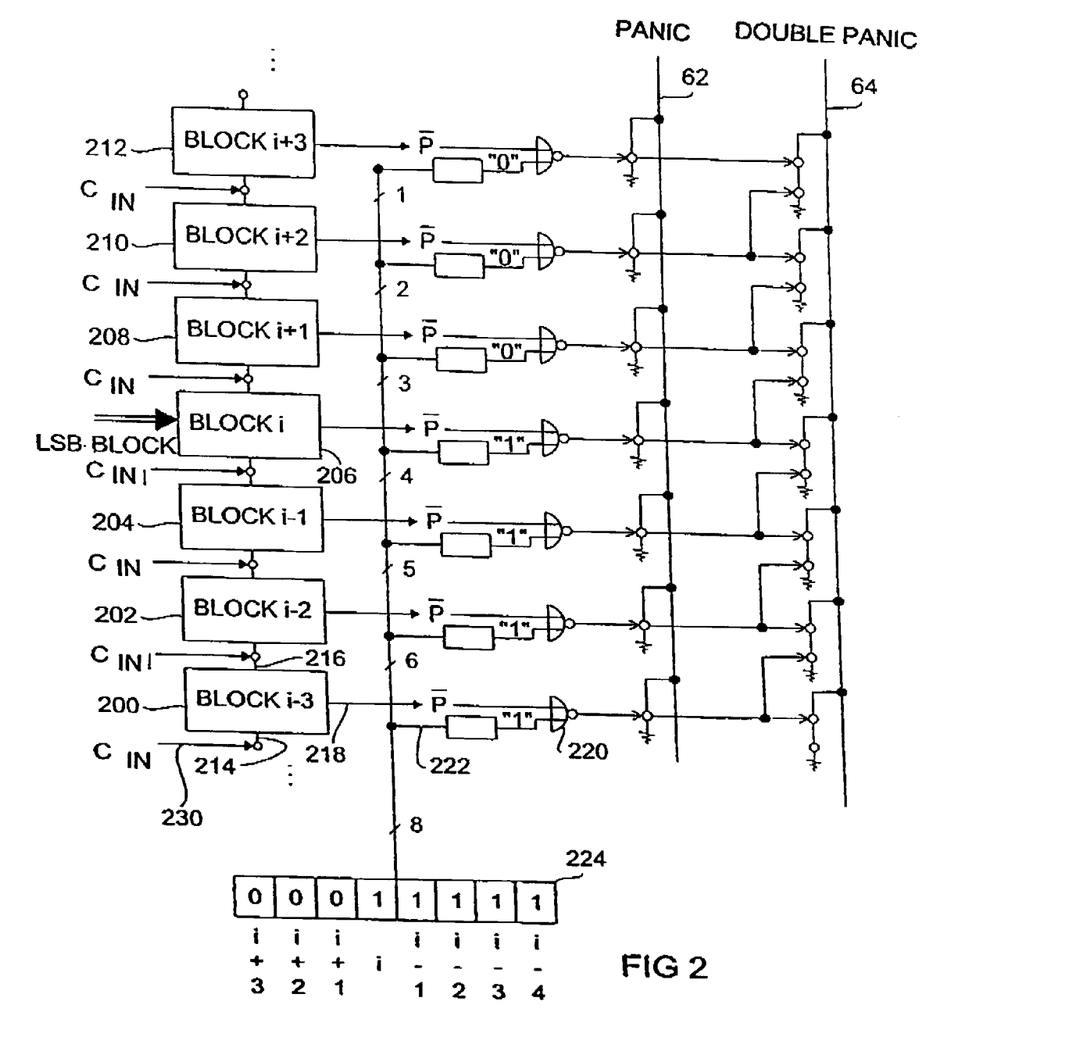
FIG. 2 shows a block diagram of a calculating unit for explaining the present invention.

In the embodiment shown in FIG. 2, the clock generator can run with three different velocities, once with a fast velocity in a normal state 60, alternatively with a medium velocity 62 in the case of a panic and with a slow velocity 64 in the case of a double-panic.

In the following, reference will be made to the operation of the calculating unit shown in FIG. 1. First, it is assumed that the normal case exists, i.e. that the calculating unit is clocked by the clock generator 52 with normal velocity 60. The normal case is present when none of the carry pass means 26, 28, 30 determine that a carry passes through a whole adder block 10, 12, 14. This means, in other words, that in every adder block an elementary cell is present, which absorbs a carry possibly impinging upon it.

Whether an elementary cell absorbs a carry, generates a carry or neither absorbs nor generates a carry but simply passes it on, can be calculated with the so-called carry-look-ahead-parameter kill, generate and propagate. This is known in the art and, for example, described in "Computer Architecture a Qualitative Approach", Hennessy & Patterson, Second Edition, Morgan Kaufman Publishers, Inc., 1996, appendix A.

For a two-operand addition, the carry-look-ahead parameters are calculated as follows:

The kill parameter indicates that a carry, which possibly comes from a lower order elementary cell, is absorbed. The kill parameter is calculated from the AND-operation of the two input operand bits and is active when the AND-operation of the input operand bits results in a 0.

The generate parameter is calculated also from the AND-operation of the input operands and indicates that this elementary cell will generate a carry. The generate parameter is active when the AND-operation of the two input operand bits results in a 1.

The propagate parameter is calculated from the OR-operation of the two input operands for an elementary cell and indicates that a carry would simply pass through an elementary cell. The propagate parameter is active when the OR-operation of the two input bits for the elementary cell equals 1.

A preferred implementation of a pass means, such as pass means 28 of the second adder block 12 consists of the fact that all propagate parameters of the elementary cells in the pass means will be ANDed. A panic signal 280 will be output when the pass means determines that a carry passes through the second adder block, i.e. that in the second adder block no elementary cell generates an active kill parameter.

In this case, the carry path is longer than an adder block and the calculating unit has to be clocked slower, as will be discussed below.

In the case where no pass means generates a panic signal, it is, however, ensured that the carry path is shorter than at a block, so that the calculating unit can be operated with the fast normal velocity 60. In a clock according to the normal velocity 60, a block, such as the second adder block 12, has to be able to output its sum bits $S_i$. Sum bits can only be output when the carries of the next lower elementary cells are present. When no pass means has generated an active panic signal, and after particularly the pass means 26 has generated no panic signal, it is ensured that in the worst case the input carry 120 is generated in the second lowest elementary cell 17 of the first adder block and then—in the worst case—passes through the whole first adder block. Thus, the clock in the normal case must therefore only be so fast that the carry from the second lowest digit 17 of the first adder block can propagate through the whole first adder block, and that then, when the input carry 120 is present in the second block 12, the sum bits for the second adder block 12 can be determined.

Thus, the processing in the second adder block takes place in two phases. First, the input carry 120 is determined. As soon as the input carry 120 is known, the sum bits of the second adder block 12 are output in a second phase. A similar procedure is carried out in parallel with all other blocks, so that in the normal case, i.e. when no panic signal 260, 280, 300 is active, it can be clocked with a clock whose clock period is so great that a carry can pass through at least part of the previous block, namely in the worst case, all elementary cells of the previous blocks minus one elementary cell, and can further pass through the whole current block. In a possible implementation, typically, the limit is not immediately achieved, but a security factor in the range of 1 to 10% is preferred.

In the following, reference will be made to the case where a pass means, such as pass means 28, generates a panic signal 280. This means that the input carry 140 in the third adder block 14 is not determined by the second adder block 12 but by the first adder block 10. In this panic case, the normal velocity of the clock generator would lead to errors. Thus, the clock generator 52 is controlled by the control means 50 to a panic velocity 62, which is a bit slower than in the normal case. Particularly, the clock velocity, with which the operands are fed in, is set such that a carry, which is generated in the second lowest elementary cell 17 of the first adder block in the worst case can propagate through the second adder block 12, since the input carry 140 is present in the second adder block 14 only then. Further, the panic clock has to be so slow that when the carry 140 is present, the sum bits can be output in the second adder block 14. In the panic case, the clock will therefore be so slow that the carry can pass through all elementary cells minus one elementary cell of the first adder block, that the carry can pass through the second adder block and that the carry can further pass through the third adder block 14. In several cases, this value is not used directly, but typically, a security factor in the range of 1 to 10% is added to the theoretically maximum panic clock period as well.

It is preferred to provide each adder block with a carry bypass. Thereby, the clock period can be decelerated in the panic case. After the second pass means 28 has already determined that the carry propagates through the second adder block 12, i.e. is not influenced by the second adder block 12, the carry at the output of the first adder block is put on the carry bypass 42 of the second adder block by the carry control means 36, and from there fed into the least significant digit by the carry control means 38, as it is illustrated in blocks 36 and 38 with dotted lines. In this case, the panic clock period has to be longer in comparison to the normal case only about that time that the carry needs to propagate across the carry bypass 42 of the second adder block. This time is typically much shorter than when a full carry ripple has to be awaited by an adder block, so that the clock period in the panic case is not much longer than in the normal case.

If, however, the control means 50 determines that two adjacent pass means, such as the pass means 28 and the pass means 30 have determined that a carry passes through both blocks, the case of a double-panic is given. In this case, the carry of the next higher adder block, which is not shown in FIG. 1, is determined by the elementary cells of the first adder block 10 in the worst case of the second lowest elementary cell 17 of the first adder block 10. In this case, if the clock is not reduced, an error will occur, since the next operands would already be fed into the calculating unit before the higher adder block (not shown in FIG. 1) downstream of the second adder block 14 has finished outputting the sum bits.

According to the invention the calculating unit will be decelerated in the illustrated embodiment, as if a carry propagates from the least significant digit of the whole calculating unit to the most significant digit of the whole calculating unit. To shorten that time, the carry bypass 42 and the carry bypass 44 are used. Since the two blocks 12 and 14 do not influence the carry, the carry is put on the carry bypass 42 by block 36, and not fed into the second adder block 14 by a block 38, as in the previously described case, but directly directed to the carry bypass 44 of the second adder block. The total duration a carry needs from the least significant digit of the calculating unit to the most significant digit of the calculating unit is thus at least shortened by using the two carry bypasses 42 and 44.

It can be seen that a double-panic case leads to a very significant slowing down of the calculating unit. To keep this case even smaller, a third panic level could be introduced, which consists of three adjacent pass means, such as pass means 26, 28, 30, which determine that a carry passes directly through their respective adder blocks. If a triple panic means is present, the calculating unit does not have to be slowed down to the overall worst case in the case of a double-panic, but has to, in analogy to the simple panic, be slowed down only so strongly that the carry can pass through at least part of the first adder block (namely, in the worst case, all bits minus one bit), the two carry bypasses 42 and 44 as well as the next higher block, which is not shown in FIG. 1. Thus, if a triple panic means is present, the clock period in the case of double-panic differs merely from the clock period in the case of simple panic in that the time that a carry needs to pass through the carry bypass 44 is longer.

An arbitrary number of panic stages can be used, wherein the benefit through another panic stage diminishes more and more compared to the additional circuit effort to determine the higher panic case. On the other hand, the number of elementary cells in an adder block can be reduced further with every higher panic stage, which immediately leads to the fact that the normal clock 60 can be increased further and further.

It should be noted that the adder blocks can internally have an arbitrary combination of calculating units. The most simple case is that each adder block is arranged as simple ripple carry adder, which, additionally to a simple ripple carry adder should generate the propagate signal per elementary cell, so that the pass means can operate on the basis of the propagate signals.

If all adder blocks are fully organized as ripple carry adder, the clock period in the normal case has to be at least so long that a carry can ripple through all elementary cells of an adder block minus one elementary cell and through all elementary cells of a downstream adder block.

However, this time can be reduced by the fact that an adder block is fully organized as carry-look-ahead adder. In this case, the carry input bit is in the second adder block 12, i.e. the carry bit 120 is present much faster. This carry bit will then be calculated to one, when at least one elementary cell in the first adder block 10 has an active generate parameter, which is followed exclusively by propagate parameters or generate parameters. The carry bit 120 will then be calculated to zero, when an elementary cell generates an active kill parameter, which is merely followed by further kill parameters or propagate parameters but no generate parameters.

Carry-look-ahead adder work very fast, but need significantly more chip area. For that reason, a tradeoff is possible in that smaller carry-look-ahead adder sub-blocks are formed, which are interconnected according to a ripple-carry adder, to generate an adder block 10, 12 or 14. The actual adder layout within the block will be dictated by practical conditions.

As it has already been discussed, the inventive calculating unit is particularly useful for cryptographic processors, since they typically need long-number calculating units of a length in a range of 160 bit for elliptic curve cryptography applications or with a length in the order of 1024 or 2048 bit for RSA calculations. This is in significant contrast to typical 8, 16, 32 or 64 bit CPUs, as can be found in general purpose processors.

With regard to the number of elementary cells in an adder block, a number between 8 and 16 elementary cells and particularly a number of 16 elementary cells for the case of a two-stage panic hierarchy is preferred. If a third panic hierarchy is provided, it is preferred to reduce the number of elementary cells in a block to, for example, 8, which corresponds immediately to a normal clock velocity double that amount. By providing carry bypasses, the panic velocity (in the case of a two-stage panic hierarchy) and/or the double-panic velocity (in the case of a three-stage panic hierarchy) be kept almost the amount as in the case of the normal velocity, since a carry typically passes through a carry bypass much faster than through the adder block itself.

FIG. 2 shows a block diagram of the inventive calculating unit with a number of adder blocks 200, 202, 204, 206, 208, 210, 212 which are designated by block i−3 to block i+3. Every adder block comprises a carry input 214 and a carry output 216, wherein, for clarity reasons, they are designated in FIG. 3 merely for block i−3 (200). Each adder block further comprises a carry pass output 218, which corresponds to an output of pass means 26, 28 or 30 of FIG. 1, wherein these outputs are designated with 260, 280, 300 in FIG. 1.

Further, means for deactivating the carry pass output is associated to each block, wherein means for deactivating is formed preferably as NOR gate 220 in FIG. 2 The NOR gate (i.e. 220) provides merely a high output signal with a logical level of "1", when the input signal, i.e. the input signal 218 of the carry output has a logical "1" level. In the embodiment shown in FIG. 2, a "low active" logic is present for the panic signal, i.e. for the signal at the carry output 218. Thus, a panic signal is present, when a low voltage value is applied at the input of gate 220. Means 220 for deactivating further comprises a control input 222, which obtains a high voltage level, when the panic signal of the respective adder block is to be turned off. If, however, the panic signal is not to be turned off, as it is the case in blocks i+1, i+2, i+3, a low voltage ("0") is applied to the voltage input.

The calculating unit shown in FIG. 2 further comprises means 224 for determining, in which of the adder blocks a least significant bit of the operand to be subtracted is disposed. In the embodiment shown in FIG. 2, means 224 is formed as a register with a number of register cells, which corresponds the number of adder blocks, in which the panic signal can be turned off. From the utilization of the register 224 it can be seen, which block is the block where the least significant bit is disposed. In the example shown in FIG. 2, the least significant bit is disposed in block i. A "1" in the register 224 means that the panic signal of the respective adder block is to be turned off. A "0" in the register means, however, that the panic signal, i.e. the carry output of the respective adder block, is to be used.

In the embodiment shown in FIG. 2, all blocks below the block i, i.e. the block wherein the LSB is disposed, will be deactivated with regard to their panic signal. Additionally, in the preferred embodiment shown in FIG. 2, the panic signal of the adder block, in which the LSB is disposed, will also be deactivated, since the carry path is here also limited, since it is the least significant "active" block of the calculating unit. This measure is advantageous in the case of a simple panic control, but it is, however, not absolutely necessary, when the normal clock cycle is held such that a carry can propagate over two complete blocks. When the normal clock, however, is chosen so that the carry can propagate across one block and at least part of the previous block, which does not comprise the least significant bit of the previous block, the block 206, in which the LSB is, also has to be deactivated.

Depending on the chosen measure, the block, in which the LSB is, can be read with regard to the register cell of the register 224 of FIG. 2, in which either the first "0" is, or in which the highest "1" is, as in the example shown in FIG. 2. In an exemplary implementation shown in FIG. 2, the register 224 as an 8-bit-wide output, wherein the control line becomes less wide by one bit after very line, so that, as is shown in FIG. 2, the register can be directly matched to the adder blocks.

It should be noted that even in long-number calculating units with many adder blocks, a panic signal turnoff means has not necessarily to be present in all adder blocks, since not the whole calculating unit width has to be provided as underflow buffer. Thus, merely, for example, the lowest eight adder blocks will be provided with the inventive measures, since adder blocks above that will never, per definition, obtain the least significant bit of the second operand.

Further, FIG. 2 shows a panic line 62 as well as a double-panic line 64 already realized on bit level, which is active when the panic signals of two adjacent adder blocks are active.

For each adder block, which can be the LSB block, further, means 230 is provided to be able to feed a carry $C_{in}$ into the carry input of the adder block. Further, as it becomes more obvious from FIG. 3a to 3e, means, which is not shown in FIG. 2, is also present, to prevent the carry at the carry output of a adder block, such as the carry output 216 of the adder block 200 from entering the carry input of the overlying adder block.

FIG. 3a to 3e show a sequence of register contents, which occurs, when the individual inventive measures are taken, to obtain an adaptive treatment of the adder blocks, lying below the adder block comprising the least significant bit. Before reference will be made to FIG. 3a to 3e in more detail, it should be noted that in the preferred elementary cell of the adder, such as the elementary cells 16, 17, 22, 24 of FIG. 1, the following organization is preferred. A preferred elementary cell comprises, apart from the actual adder for adding the operands a, b, the operand registers itself. If, for example, considering a two-operand adder, an elementary cell comprises a memory location for the respective bit of the first print, a memory location for the respective bit of the second operand as well as a memory location for the respective sum bit c, obtained by addition of the first and second operand. When considering a three-operand adder, each elementary cell comprises three register memory locations for the three input operands and a register cell for the respective output bit. In this case, the adder itself consists of a half adder and a downstream full adder.

Figure 3A:
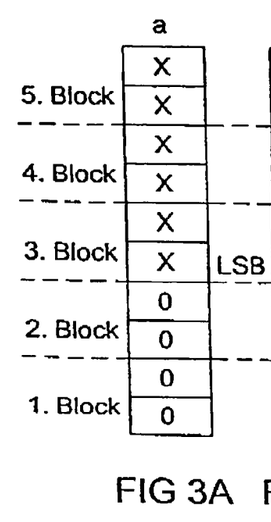
FIGS. 3a to 3e show a representation of the situation in the result register of the calculating unit depending on different inventive measures.

FIG. 3a shows the register utilization of a first operand in a stacked up manner. For the example shown in FIG. 3a, it is assumed that the calculating unit comprises five adder blocks all in all, wherein the least significant bit of the first operand a is in the third adder block of the calculating unit.

Figures 3B, 3C:
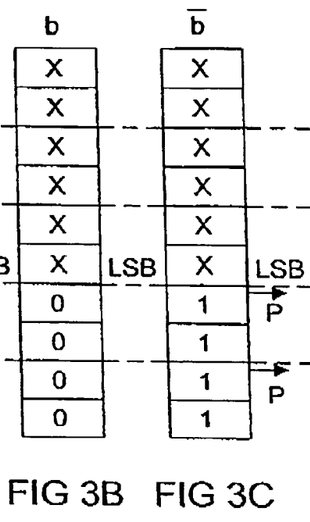

In FIG. 3b, the second operand register of the calculating unit is shown. The least significant bit of the second operand b is also in a third adder block. It should be noted, that meaningful bits are designated with crosses in FIG. 3a and 3b, while unused bits are set to a value of "0" in the respective registers in the shown embodiment.

An inversion of the second operand register leads to a situation as it is shown in FIG. 3c, i.e., that all bits below the least significant bit, which means all bits of the first and second adder blocks, become 1.

Figures 3D, 3E:
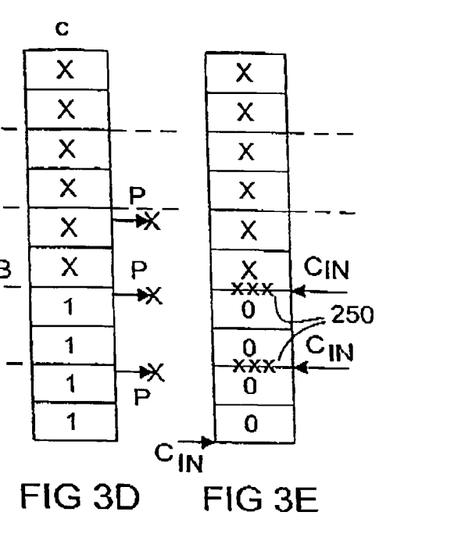

Now, the inventive calculating unit would generate a panic signal both for the first adder block and for the second adder block, since the propagate parameters of the two operands a and $\bar{b}$ are equal to 1 for the first and second adder block. These panic signals would, in the case shown in FIG. 3c, initiate not only a panic but even a double-panic, which is generated "artificially". To prevent this case, the panic signals of the first and second adder blocks are turned off, as is shown in FIG. 3d, i.e. the carry path outputs of the first and second adder blocks are deactivated. Above that, in FIG. 3d the preferred case is shown, wherein the panic signal of the third adder block, the block where the LSB is, is also deactivated.

To bring the bits in the adder blocks No. 1 and No. 2 back to their initial state, i.e. the value of "0", further, a carry $C_{in}$ is fed into every carry input of the respective adder blocks No. 1 and No. 2, as it is shown in FIG. 3e. Further, as it is also shown in FIG. 3e, a carry is also fed into the third block, where the LSB is, to consider the addition of "1" in the discussed subtraction equation. Finally, as is shown in FIG. 3e at 250, a carry barrier is introduced for all adder blocks below the adder blocks containing the LSB, such that the carry output signal of a block can enter the carry input of the next higher block.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A calculating unit, comprising:
    a plurality of adder blocks, wherein each adder block comprises a plurality of single adders, a carry input, a carry output and a carry pass output, wherein a total number of single adders of the plurality of adder blocks is greater than a number of digits of an operand to be subtracted, wherein a signal at the carry pass output of one of the adder blocks is indicative of a carry passing through the respective adder block;
    a clock generator for feeding the adder blocks with operands to be processed according to a clock;
    a controller for controlling the clock generator such that the clock with which the operands to be processed are fed in, is decelerated, when the signal at the carry pass output is active;
    a unit for determining in which adder block of the adder blocks a least significant bit of the operand to be subtracted is disposed;
    a unit for deactivating the carry pass output of one or several adder blocks, which are provided for lower order digits with respect to the adder block in which the least significant bit of the operand to be subtracted is disposed; and
    a unit for feeding in a carry into the carry input of the adder blocks in which the least significant bit of the operand to be subtracted is disposed.

2. The calculating unit according to claim 1, with which an operand is subtracted from an operand, wherein the subtraction is carried out according to the following equation:

$$c=a+(\bar{b}+1),$$

wherein c is a result of the subtraction, and wherein the character "¯" represents an inversion.

3. The calculating unit according to claim 1,
    wherein each of the single adders comprises a first register for a first operand bit, a second register for a second operand bit, an adder unit and an output register for a result bit of an operation.

4. The calculating unit according to claim 3, further comprising a unit for inverting the second register of each single adder of the plurality of adder blocks.

5. The calculating unit according to claim 1, wherein the unit for deactivating comprises:
    for an adder block, a switch unit with an input, an output and a control input, wherein a signal of a respective carry pass output is applied to each input, and wherein a deactivating signal for the respective adder block is applied to the control input.

6. The calculating unit according to claim 5, wherein the unit for determining comprises a register with a plurality of register cells, wherein the number of register cells is equal to a maximum number of adder blocks, whose carry pass output can be deactivated, wherein a bit in a register cell with a first state refers to an adder block, whose carry pass output is to be deactivated, and wherein a bit in a register cell with a second state refers to an adder block, whose carry pass output is not to be deactivated, wherein an output line is provided for each register cell, and wherein each output line is connected to the control input of the switch unit, which is associated with the respective adder block.

7. The calculating unit according to claim 1,
    wherein the clock generator is disposed to choose the clock in a case where no carry pass output of the plurality of adder blocks is active, such that within one clock period one carry propagates through a complete adder block and at least part of a previous adder block,
    wherein the clock generator is further disposed to control the clock in a case where a carry pass output is active, such that within one clock period a carry propagates through two complete blocks and at least part of a previous block, wherein the clock period is, however, shorter than a time a carry needs to propagate across three complete blocks and at least part of a previous block, and
    wherein the clock generator is further disposed to control the clock in a case where two carry pass outputs of two adjacent adder blocks are active such that within one clock period a carry propagates through at least three complete blocks and part of one previous block of the three complete blocks.

8. A method for subtracting a second operand from a first operand with a calculating unit with a plurality of adder blocks, wherein each adder block comprises a plurality of single adders, a carry input, a carry output, and a carry pass output, wherein a total number of single adders of the plurality of adder blocks is greater than a number of digits of an operand to be subtracted, wherein a signal at the carry pass output of a respective adder block is indicative of a carry passing through the respective adder block, comprising:

controlling a clock, by which operands to be processed are fed in, so that the clock is decelerated when a signal is active at a carry pass output;

determining, in which adder block a least significant bit of the operand to be subtracted is disposed;

deactivating the carry pass output of one or several adder blocks, which are provided for lower order digits with respect to the adder block, in which the least significant bit of the operand to be subtracted is disposed; and feeding in a carry into the carry input of the adder block, in which the least significant bit of the operand to be subtracted is disposed.

* * * * *